United States Patent
De Wergifosse et al.

(10) Patent No.: US 9,512,932 B2
(45) Date of Patent: Dec. 6, 2016

(54) ELECTRICALLY CONTROLLED ACTUATING DEVICE INCORPORATING A THERMOSTATIC FUNCTION, AND VALVE

(71) Applicant: SNECMA, Paris (FR)

(72) Inventors: Huguette De Wergifosse, Saint Augustin (FR); Eric De Wergifosse, Saint Augustin (FR)

(73) Assignee: SNECMA, Paris (FR)

(*) Notice: Subject to any disclaimer, the term of this patent is extended or adjusted under 35 U.S.C. 154(b) by 120 days.

(21) Appl. No.: 14/389,235

(22) PCT Filed: Mar. 29, 2013

(86) PCT No.: PCT/FR2013/050696
§ 371 (c)(1),
(2) Date: Sep. 29, 2014

(87) PCT Pub. No.: WO2013/144524
PCT Pub. Date: Oct. 3, 2013

(65) Prior Publication Data
US 2015/0083944 A1    Mar. 26, 2015

(30) Foreign Application Priority Data
Mar. 30, 2012 (FR) ..................... 12 52889

(51) Int. Cl.
*F16K 11/06* (2006.01)
*F16K 31/00* (2006.01)
(Continued)

(52) U.S. Cl.
CPC ............... *F16K 31/002* (2013.01); *F02C 6/12* (2013.01); *F02C 9/18* (2013.01); *F16K 1/18* (2013.01);
(Continued)

(58) Field of Classification Search
USPC .......................................... 137/468
See application file for complete search history.

(56) References Cited

U.S. PATENT DOCUMENTS 2,118,299 A * 5/1938 Owen ................ G05D 23/08
137/468
3,963,042 A * 6/1976 Bible ..................... F02P 5/103
137/468

(Continued)

FOREIGN PATENT DOCUMENTS

DE    10205518    9/2002
DE    102009023592    12/2009

OTHER PUBLICATIONS

International Search Report issued for International Application No. PCT/FR2013/050696, dated Jul. 1, 2013.

*Primary Examiner* — John Fox
(74) *Attorney, Agent, or Firm* — Pillsbury Winthrop Shaw Pittman LLP

(57) ABSTRACT

A actuating device includes a fixed portion forming a frame including an inlet intended to receive a fluid, a main outlet and a sampling outlet and a return device for exerting a mechanical force on a movable portion; a movable portion including a shutter moving between an open position and a closed position; a thermostatic device including a conical turning disc, the turning of the disc above a known critical temperature driving the shutter to the closed position of same; a control device allowing a holding force for holding the shutter to be generated, the control device being able to be controlled in such a way that below the critical temperature, the opening or the closing of the valve results from the balance between the holding force and the mechanical force.

12 Claims, 5 Drawing Sheets

(51) Int. Cl.
*F02C 9/18* (2006.01)
*F16K 31/56* (2006.01)
*F16K 31/06* (2006.01)
*F02C 6/12* (2006.01)
*F16K 1/18* (2006.01)

(52) U.S. Cl.
CPC ......... *F16K 31/0655* (2013.01); *F16K 31/566* (2013.01)

(56) References Cited

U.S. PATENT DOCUMENTS

| | | | | |
|---|---|---|---|---|
| 4,026,465 | A * | 5/1977 | Kenny | G05D 23/022 169/60 |
| 4,508,132 | A * | 4/1985 | Mayfield, Jr. | F16L 55/00 137/468 |
| 5,318,268 | A * | 6/1994 | Cox | F16K 31/002 137/468 |
| 8,234,865 | B2 * | 8/2012 | Andrews | F01D 17/085 137/468 |
| 8,616,462 | B2 * | 12/2013 | Schneider | E03B 1/048 137/468 |
| 2010/0011764 | A1 | 1/2010 | Andrews | |

* cited by examiner

US 9,512,932 B2

ELECTRICALLY CONTROLLED ACTUATING DEVICE INCORPORATING A THERMOSTATIC FUNCTION, AND VALVE

CROSS REFERENCE TO RELATED APPLICATIONS

This application is the U.S. National Stage of PCT/FR2013/050696, filed Mar. 29, 2013, which in turn claims priority to French Patent Application No. 1252889 filed Mar. 30, 2012, the entire contents of all applications are incorporated herein by reference in their entireties.

FIELD

The field of the invention relates to actuating devices such as valves used in aircraft engines particularly for the regulation of depressurisation systems and/or heat exchange systems of the lubricating unit. The invention relates, more particularly, to valves that require a system of commands making it possible to limit the code lines of a computer for aircraft engine.

STATE OF THE PRIOR ART

At present, in aeronautics, the constraints of managing aircraft engines are bringing about an optimisation of computers as regards the architecture and programming thereof.

The tasks performed by these computers are numerous and cannot tolerate errors. Generally and by way of example, a computer for aircraft engine controls the fuel supply, the internal geometry of the engine, the interfaces with the thrust reverser and assures advanced functions such as protection against overspeeding. It is thus important to limit the number of commands of electrical controls coming from the computer, also known as "engine computer", particularly all the engine regulation systems. In particular, the systems of engine lubrication regulation, oil enclosure depressurisation, heat exchange system of the lubricating unit are concerned.

These systems generally comprise regulation valves. A solution to limit the command lines of the engine computer is to have available hybrid or thermostatic valves, in other words incorporating commands limiting the number of lines of the computer.

An example of solution of thermostatic valve is based on the principle of expansion of a liquid or a gas. The valve is composed of an enclosure comprising a liquid or a gas that expands or contracts as a function of the temperature. This pressure is transferred to the liquid separation element which may be, for example, a gusset or a membrane.

The adjustment position is determined by the balance of the forces between the return spring and the separation element. This type of valve is autonomous and operates without input of energy.

A disadvantage of this solution is the unreliability of the separation element and its poor fatigue resistance, which decreases with the number of cycles of use. A risk of leakage is to be envisaged in the event of degradation of said element.

Furthermore, the thermostatic device comprises a disadvantage with regard to the precision of the critical temperature above which an action on the valve is engaged, particularly because the thermostatic element wears and degrades over time.

The requirement of robustness of these applications also imposes high reliability requirements.

Another example relies on a principle based on the expansion of a solid, such as bimetallic strips. The two materials of a strip have different thermal expansion coefficients. Under the effect of temperature, the two materials bend generating a deflection. The displacement of the solid is then transformed into a displacement of a shutter equipped with its return spring.

This second example of valve is illustrated in patent application DE 10205518 (A1). This patent is based on the use of conical turning disc for thermostatic valve, the original title of which is: "Thermostatic valve for controlling oil flow for IC engine has bimetallic strip which opens valve cone when temperature reaches predetermined value."

This second example comprises the disadvantage of having to involve the addition of a second control valve in so far as the architectures of controlled valves is combined with the use of conical turning disc.

In aircraft engine applications, a disadvantage is that of the minimisation of the number of lines of the engine computer, which cannot be assured during the use of a plurality of valves.

All of the existing solutions comprise disadvantages from the moment that a thermostatic function has to be incorporated in a valve. It may involve a lack of reliability of the thermostatic element or instead a complexity of the architecture requiring the use of a plurality of valves.

SUMMARY OF THE INVENTION

The invention enables the aforementioned disadvantages to be resolved.

The subject matter of the invention is an actuating device, which may be a valve.

The actuating device comprises:
  a fixed portion forming a frame comprising an inlet intended to receive a fluid, a main outlet and a second known as "bleed" outlet and return means for exerting a mechanical force on a movable portion;
  a movable portion comprising;
    a shutter moving in translation between an open position of the bleed outlet and a closed position of the outlet under the effect of the mechanical force;
  a thermostatic device comprising a conical turning disc, the turning of the disc above a known critical temperature driving the shutter to the closed position of same;
  a control device allowing a holding force for holding the shutter to be generated, the control device being able to be controlled in such a way that below the critical temperature, the opening or the closing of the shutter results from the balance of forces between the holding force and the mechanical force.

The holding force may be an electromagnetic force which makes it possible to retain the shutter in open position. The holding force then opposes the mechanical force.

A technical advantage of this solution is that the turning of the disc takes place for a precise given temperature thus with little disparity in the margin of error. Moreover, the critical turning temperature may be easily configured, particularly by a choice of suitable conical turning disc. The internal or external diameter of the disc, its thickness or the materials constituting the two layers may be chosen so as to adapt a configuration to a case of use.

Advantageously, the mechanical force is exerted by at least one spring under the effect of a return force.

The advantage of this technical solution is that it adapts itself to the majority of already existing mechanisms comprising a return spring and a shutter in the valves.

Advantageously, the shutter comprises a core, a rod and an integral closing ball moving in translation to the closed position of same either under the effect of the mechanical force of the return means, or under the effect of the turning of the disc above the critical temperature.

A technical advantage of this solution is that the shutter may comprise for example parts readily available commercially.

Advantageously, the conical turning device is integral with a collar movable around the rod of the shutter and mechanically driving the ball into a closed position of the shutter when the temperature exceeds the critical temperature.

A technical advantage, of this solution is that a collar may be laid out and arranged easily on a rod. Consequently, the mechanical incorporation of the solution is simplified. The ball is a simple mechanism, inexpensive and easy to incorporate.

Advantageously, the ball comprises a ring integral with the ball, the collar driving said ring on a portion of its surface when the conical turning disc turns round.

A technical advantage of this solution is that the ring makes it possible to increase the contact surface with the collar and optimise the transmission of effort during the displacement of the turning disc driving the translation of the shutter.

Advantageously, the control device is controlled by an electrical set point allowing a magnetic field to be generated using a coiling device, the core of the shutter comprising at least in part a ferromagnetic material, the induced magnetic force being able to be greater than the mechanical force so as to maintain the shutter in its open position below a critical temperature.

A technical advantage of this solution is that it may be easily incorporated in an actuating device without increasing the volume of a conventional device. Since the core is made of ferromagnetic material, there is no need to insert additional parts in the shutter. The coils may be simply incorporated in the frame. Another advantage resides in the simplicity of configuration from the choice of a current generating a magnetic field. The intensities of the resulting magnetic forces are thus easily adjustable.

A variant of the device may also be proposed. This variant relates to a control device comprising a hydraulic regulating device controlled by a hydraulic control making it possible to supply the chamber of the spring either with ambient pressure, in other words a low pressure, or with the control pressure, corresponding to a high pressure. The pressure difference between that reigning in the shutter side chamber and that in the spring side chamber makes it possible to generate a force retaining the shutter and which can be greater than the mechanical force so as to maintain the shutter in its open position.

A technical advantage of this solution is that it makes it possible to reduce the electrical power required by the use of an intermediate hydraulic muscle.

Advantageously, the hydraulic control is either a servo-valve or a solenoid type valve, also known as an electrically operated valve.

Advantageously, the frame comprises a third outlet, known as control outlet, the control device bleeding either the pressure coming from said outlet or the ambient pressure so that said pressure controls the inlet of the actuating device.

A technical advantage of this solution is that it economises the production of energy known as "muscle energy" since the energy used hydraulically stems from an outlet of the actuating device itself. The mechanism may thus be partially self-sustaining.

The conical turning device is also integral with a collar movable around the rod of the shutter and also mechanically driving the ball into a closed position of the shutter when the temperature exceeds the critical temperature.

A variant of the device of the invention may also be proposed, when the conical turning device makes it possible to act on an electrical circuit by an opening or closing of said circuit. This action on the circuit makes it possible to cancel out either a magnetic force, or a hydraulic force when the temperature exceeds the critical temperature, which makes it possible to close the shutter under the simple mechanical force of the spring.

A technical advantage of this solution is that this technology may be easily adaptable to an existing mechanism since only the control unit is modified.

One of the main advantages of the present invention is the reduction of code lines in the computer.

BRIEF DESCRIPTION OF THE DRAWINGS

Other characteristics and advantages of the invention will become clear from reading the detailed description that follows, with reference, to the appended figures, which illustrate.

DESCRIPTION

The figures hereafter illustrate different embodiments in which a conical turning disc is electrically or mechanically coupled to an actuating device such as a valve.

In a first embodiment represented in FIGS. 2 and 3, the conical turning disc is incorporated mechanically in the shutter of an actuating device in which means of generating an electromagnetic force are used to maintain the shutter open below a critical temperature.

In a second embodiment represented in FIG. 4, the conical turning disc is incorporated mechanically in the shutter of an actuating device in which means of generating a hydraulic force are used to maintain the shutter open below a critical temperature.

In a third embodiment, the conical turning disc is incorporated in an electrical control device enabling the control of a force, either hydraulic or electromagnetic, for example by activating its cancellation above a certain temperature.

Each of these embodiments is detailed in the description hereafter.

Figure 1A:
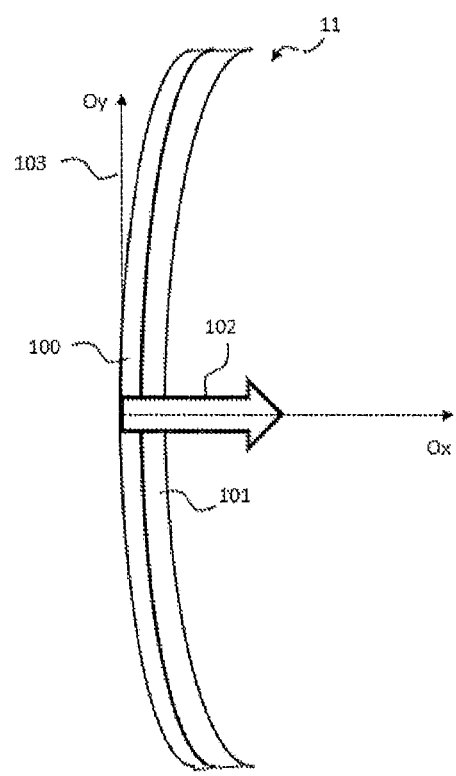
FIGS. 1A and 1E: a conical turning disc in two different positions depending on the temperature.
Figure 1B:
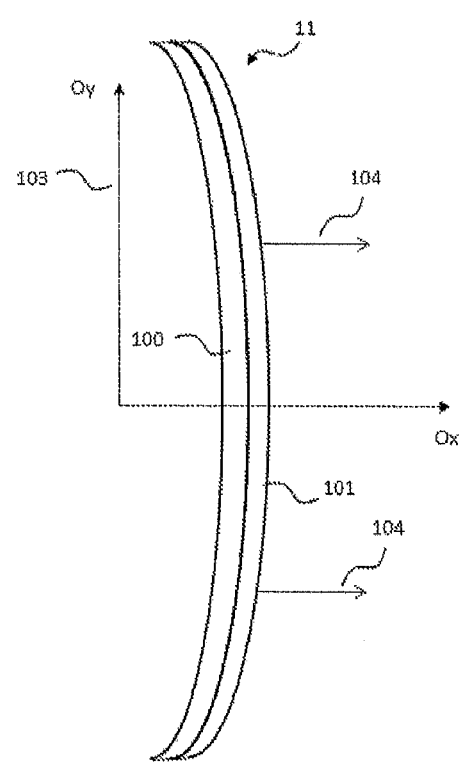

FIGS. 1A and 1B represent, for a correct understanding of the embodiments detailed hereafter, the operation of a conical turning disc.

FIG. 1A represents a conical turning disc, noted CTD in the remainder of the description, in a first state below a certain temperature, known as "critical temperature". The critical temperature of the CTD is the temperature above which the disc turns round under the effect of the increase in the temperature.

The CTD, noted 11 in FIG. 1, comprises two substantially circular superimposed layers 100, 101 which form a ring in a transversal section plane (Oy, Oz) not represented in FIG. 1. In the space, the CTD forms an annular cone in the space which may be substantially rounded on its surface. The surface of the CTD forms a sheet which may be more or less regular. Depending on the embodiments, other forms may be envisaged in so far as the effect of turning the disc may be allowed under the effect of exceeding a critical temperature.

The two superimposed layers 100, 101 of the CTD are placed side by side and integral with each other, such that they form a single part 11. The two layers 100, 101 remain placed side by side during any use in the device of the invention. The two layers are made of different materials or alloys having different mixing levels such that the expansion coefficient of a first layer is greater than that of a second layer.

Preferentially, along the axis OY represented in FIG. 1A or 1B of the reference point 103, if a convention makes it possible to define the CTD as concave in FIG. 1A, then the CTD along the same axis is convex in FIG. 1B due to the turning.

Below a critical temperature, the CTD is then defined as concave and above the critical temperature, it is defined as convex. It involves here defining a convention and not characterising a structural shape of a mechanical part.

FIG. 1B represents particularly the CTD in a second state above a critical temperature.

Mechanically, the turning of the CTD results from a force 102 exerted over the entire surface of the CTD. The turning is brought about by the expansion of the two layers each comprising a different expansion coefficient and being integral with each other. The turning is accompanied by a resultant linear force in the direction (Ox) which tends to make the disc move in the direction of the axis (Ox) along the movement represented by the arrows 104 under the impulse of said resultant force.

The critical temperature is defined by a function that depends on the materials used for each layer, the thickness of each layer, the minimum and maximum diameters of the ring that forms the CTD. A desired critical temperature may thus be easily configured in so far as the dimensions of the CTD may be adapted to a desired case of use.

The actuating device of the invention comprises a fixed portion forming a frame comprising an inlet intended to receive a fluid, a main outlet and a second known as "bleed" outlet and a movable portion moving in the frame between two positions. A first position makes it possible to open the bleed outlet and a second position makes it possible to close the bleed outlet.

In the remainder of the description, one will speak generally of an open position to signify that the bleed outlet is open and a closed position to signify that the bleed outlet is closed. The main outlet is constantly open.

Figure 2:
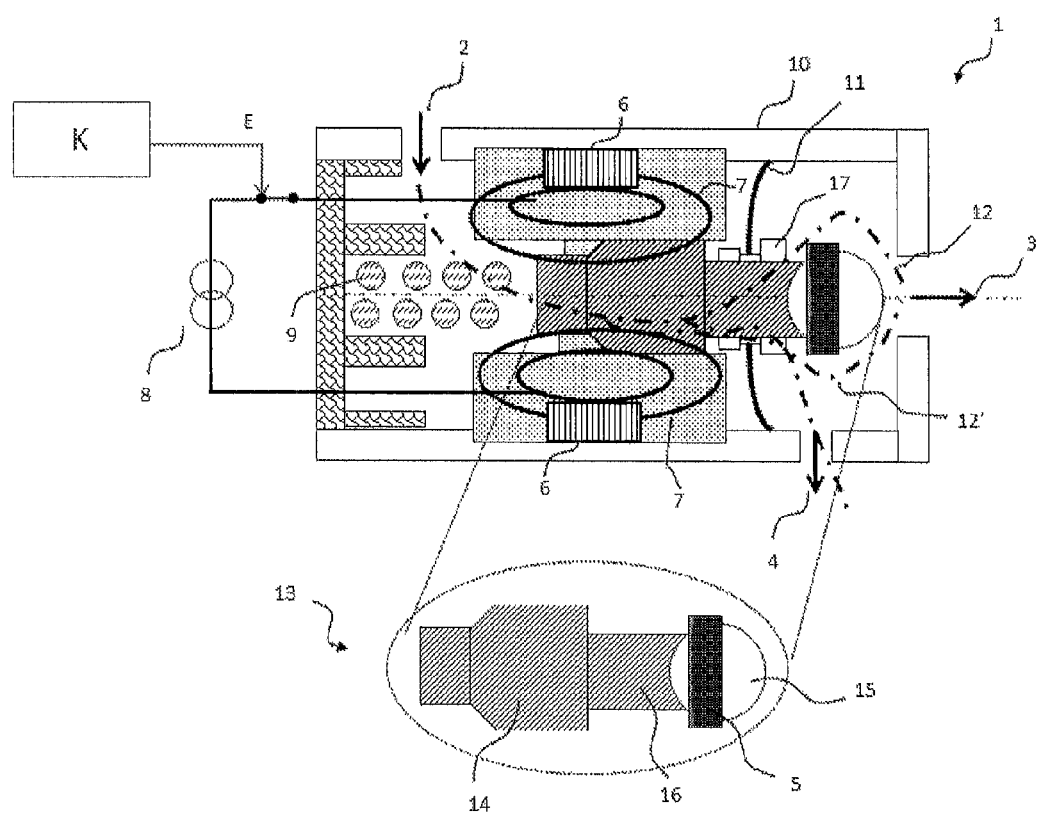
FIG. 2: a first embodiment of a valve of the invention with an electromagnet type device.

FIG. 2 represents the first embodiment of the actuating device which comprises a shutter, the latter being in an open position.

A valve 1 comprises an electromagnet 6 controlled by a computer K. The computer K comprises means of selecting a current E coming from a generator 8, said current making it possible to manage a magnetic field 7 from a coil 6.

The coil 6 is advantageously comprised in the frame 10 of the valve 1 and is supplied by the current E coming from the computer K.

In this first embodiment, the electromagnet 6 comprises a rod equipped with a shutter movable in translation.

The coil 6 is capable of generating a magnetic field making it possible to generate an electromagnetic force maintaining the movable portion 13, forming the shutter which comprises in part a ferromagnetic material, in the first position, as long as the temperature is situated below a critical temperature.

A return spring 9 makes it possible to generate a force which is opposed to a direction of a translation movement of the shutter 13 which moves between an open position making it possible to open a bleed outlet 3 and a closed position allowing the outlet 3 to be closed and to "bypass" the fluid entering into the valve to the main outlet 4.

The second position makes it possible to allow a portion of the fluid to flow to the outlet of the valve noted 3.

The return spring 9 makes it possible to generate a force known as "taring force". The latter exerts a force tending to push back the shutter to its second position so as to obstruct the bleed outlet 3.

The second position, closed position is either obtained by the effort of the spring in the absence of electromagnetic force, or by the effort of the turning disc while it is turning, effort dimensioned to overcome the remaining electromagnetic effort.

The actuating device of FIG. 1 comprises a conical turning disc 11, also noted CTD, which is represented in a first state when the temperature is below a predefined or known critical temperature. In said first state, the CTD has a concave surface facing the bleed outlet 3. Above the critical temperature, the CTD turns round and has a convex surface towards the bleed outlet, it is then in a second state. Depending on the temperature, the CTD is in the first or the second state.

In an embodiment variant, the CTD is fixed or resting on a collar 17 that slides freely in translation around the shutter 13. When the CTD turns round, a drive force tends to generate a movement of the CTD which drives in translation the collar 17 around the shutter.

In an embodiment variant, the shutter comprises a ball 15 which makes it possible to close the bleed outlet 3 while obstructing the outlet and a stop 5 which makes it possible to increase the contact surface between the collar 17 and the shutter 13. Moreover, the shutter comprises a rod 16 around which the collar 17 may be arranged so as to slide along said rod 16. The shutter also comprises a core which comprises at least in part a ferromagnetic material reacting to the magnetic field induced by the coil(s).

The return force of the spring and the holding force of the magnetic field oppose each other. The current E supplying the coil 6 may be controlled so as to generate a desired magnetic force.

If the magnetic force is no longer supplied, the return spring naturally pushes the shutter 13 to the closed position of the bleed outlet.

If we note Tc the critical temperature, we have the following cases:
- if T>Tc, the shutter closes the bleed outlet 3 because the CTD is turned round;
- if T<Tc, the shutter is in a position that depends on the resultant of the forces between the applied magnetic force and the taring force exerted by the spring.

When the temperature is below the critical threshold, the position of the valve results from the balance between the return force of the spring and the magnetic attraction force existing or not existing depending on the powered on unpowered state of the coil.

In conclusion, for a temperature below the predefined threshold defined by the critical temperature, the supply of the coil controls the opening and the closing of the flow of the liquid bled at the bleed outlet.

Figure 3:
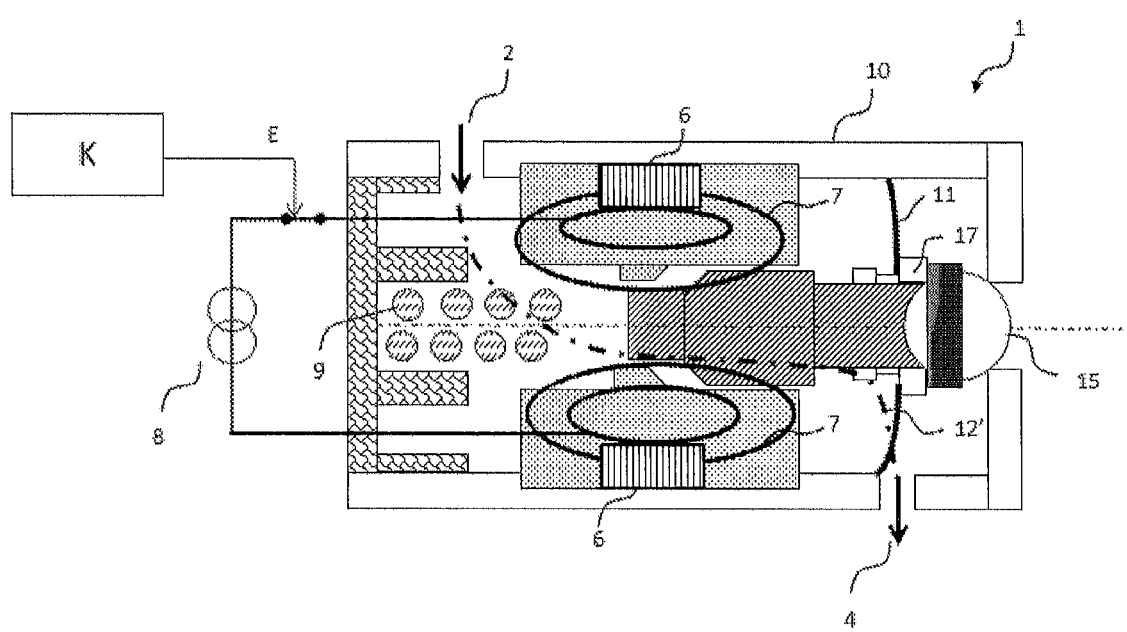
FIG. 3: the first embodiment, the turning disc having engaged the closing of the shutter.

FIG. 3 represents the valve in which the CTD is turned round, the temperature having exceeded the critical temperature threshold. The valve is in a position in which the fluid entering at the level of the inlet 2 is integrally traversing towards the main outlet 4. No portion of the fluid is bled via the outlet 3.

Figure 4:
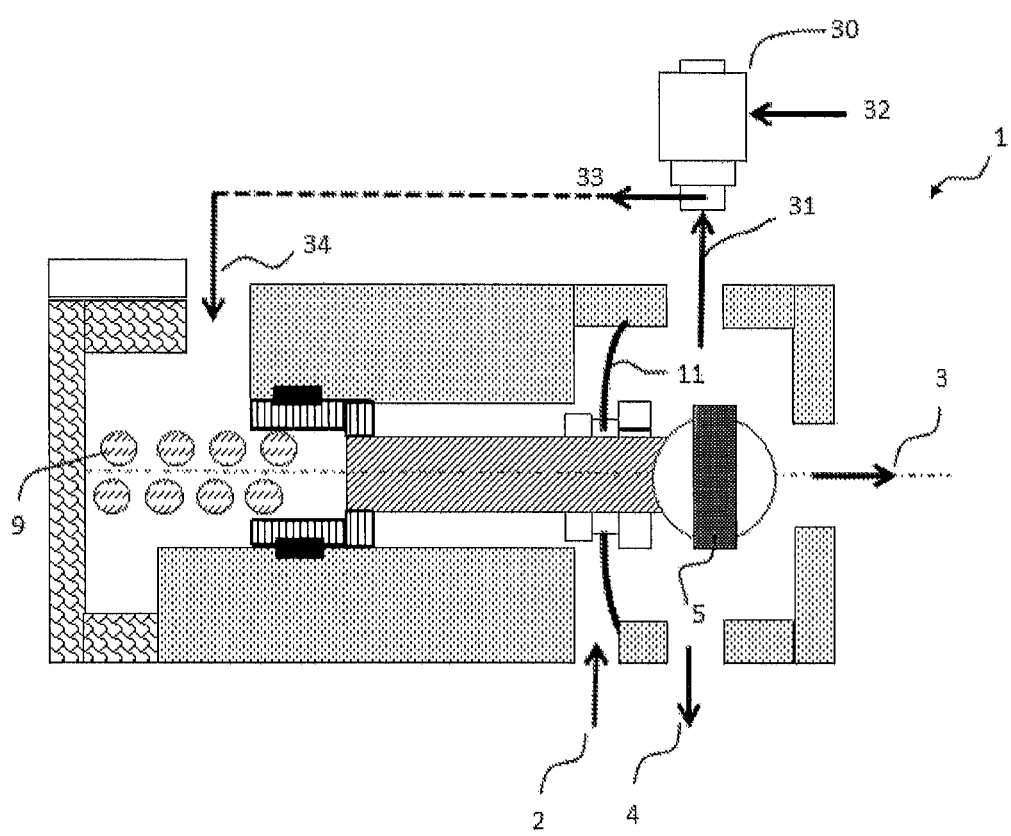
FIG. 4: a second embodiment of the invention with a hydraulic control device.

FIG. 4 represents a second embodiment in which the force generated to control the opening or the closing of the shutter below the critical temperature is no longer a magnetic force but a hydraulic force.

A hydraulic force is generated by a pressure difference between an inlet 34 situated upstream of the shutter and the outlet of the actuating device 1 taken at the level of the outlet 4 or at any point of the cavity situated downstream of the shutter before the evacuation of the fluid.

In FIG. 4, the main inlet 2 of the fluid is represented at the bottom of the figure and near to the main outlet 4. Obviously, any other equivalent arrangement is possible in this embodiment.

When no hydraulic force is generated other than that generated by the flow of the fluid at the level of the main inlet 2, the latter naturally opposes the taring force of the spring 9. In fact, since the inlet 2 is situated downstream of the shutter, the hydraulic force stemming from the main flow tends to oppose the taring force of the spring.

The pressure difference may be obtained by the introduction of a fluid at a suitable flow at the inlet 34 of the actuating device 1. The pressure difference between the inlet of the frame 34 and the main outlet 4 generates a force driving the shutter to the closed position.

An electrical control device hydraulically controls a hydraulic regulating device. In the embodiment of FIG. 4, the control is hydraulic.

The fluid 33 introduced at the inlet of the actuating device 1 may come from a suitable hydraulic regulating device such as a control valve controlled by a solenoid 30 or a servo-valve. In an embodiment variant, a rod slides inside a slot equipped with the turning disc.

An electric or magnetic control makes it possible to control the hydraulic regulating device so as to control the incoming pressure, depending on the cases: being able to be a low pressure or a high pressure, at the inlet 34. Consequently, a hydraulic force may be generated so as to obtain the closing or the opening of the shutter depending on the state of balance of the resulting forces between the taring force of the spring and the hydraulic force resulting from the pressure difference between downstream and upstream of the shutter.

In an improved embodiment, the hydraulic control in closing the shutter 13 is obtained by the pressure bled via an outlet 31, known as control outlet. Conversely, the hydraulic control in opening the shutter 13 is obtained by ambient pressure.

An advantage of this solution is to recover a portion of the energy of the fluid in the outlet of the actuating device 1 so as to control the movement of the shutter 13.

The bleed of the pressure 3 at the outlet of the actuating device 1 may also serve to control the hydraulic regulating device to obtain the closing of the shutter. The shutter, the spring, the hydraulic regulating device 30 or 30' as well as the control opening 31 may be adapted to dimension a balance of the hydraulic forces, easily controllable from an external electrical control.

Still with the same notation Tc representing the critical temperature of the CTD, we have the following cases:
if T>Tc, the shutter closes the bleed outlet 3 because the CTD is turned round;
if T<Tc, the shutter is in a position that depends on the resultant of the forces between the hydraulic force obtained from the hydraulic regulating device and the taring force exerted by the spring.

Figure 5:
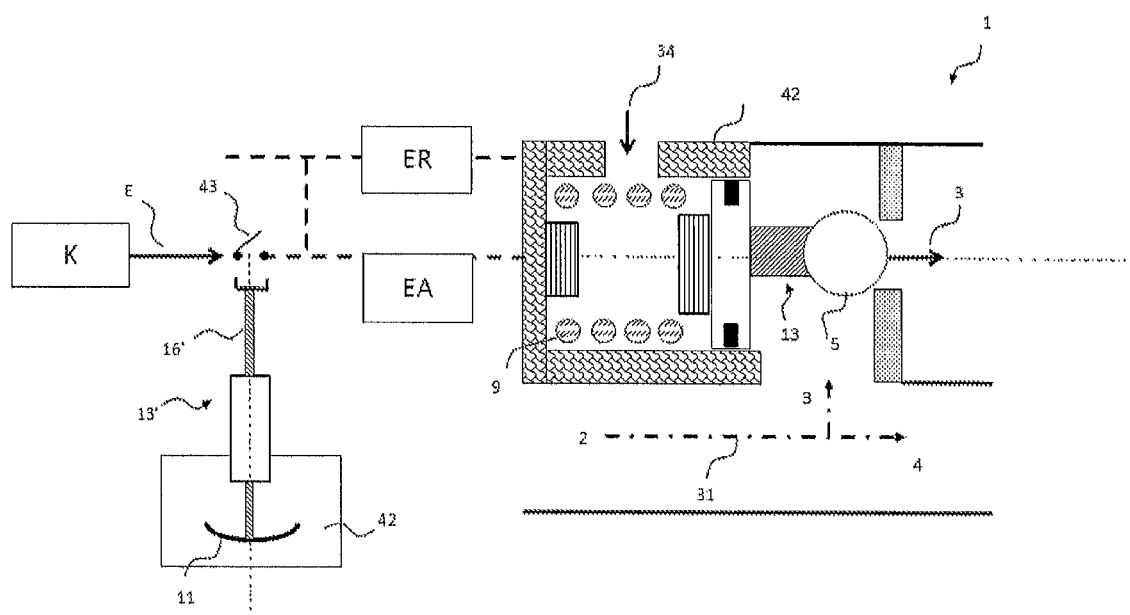
FIG. 5: a third embodiment in which the turning disc is incorporated in an electrical control cut off device.

FIG. 5 represents a third embodiment of the invention in which the turning disc is incorporated in the control device of the actuating device 1.

The control device 42 comprises for example a CTD that is arranged so as to engage the movement of a rod 16' of a movable component 13'.

When the temperature exceeds the critical temperature, the CTD turns round and drives a displacement of the movable component 13'. The movable component 13' activates or deactivates an electrical control E at the level of a switch 43 depending on the implementation of the solution.

The current transmitted when the switch 43 is closed forms an electrical set point controlling an electromagnetic device or a hydraulic regulating device.

These two devices are represented in FIG. 5 respectively by the notations ER designating for example an electrically operated valve for the injection of a fluid modifying the pressure inside the actuating device via the control inlet 34 and EA designating an electromagnet capable of generating an electromagnetic force. These two devices may be used in an alternative manner, nevertheless they are both represented in FIG. 5.

The control inlet 34 makes it possible to introduce a fluid so as to generate a pressure difference downstream and upstream of the shutter 13 so as to generate a resultant hydraulic force making it possible to displace the shutter to the outlet 3 so as to obstruct it.

When no regulation fluid is introduced into the inlet 34, then the shutter is in open position, the taring force of the spring and the force induced by the pressure of the fluid coming from the inlet 2 downstream of the shutter makes it possible to maintain the latter in balance.

In an embodiment variant, the CTD may be associated with a micro-switch that enables the turning and acts on the electrical circuit by a cut off or a closing of the circuit. The micro-switch makes it possible to control for example the power supply of the solenoid or the servovalve if an ER device is used or the power supply of a coil if an EA device is used.

In the absence of hydraulic or magnetic force generated by a control device 42, the spring moves the shutter 13 to the closed position of a bleed outlet 32.

When the temperature is below the critical turning temperature, there is no cut off of the power supply circuit by the micro-switch. The position of the shutter depends on the powered or unpowered state of the coil for an EA or ER type device. An input flow 2 follows a channel to a main outlet 4. When the shutter is in open position, the bleed outlet 3 makes it possible to route a portion of the fluid flowing in the actuating device 1 to another conduit not represented.

This embodiment may be combined with the second embodiment of FIG. 4 in which a portion of the fluid downstream of the shutter was bled and controlled by a hydraulic regulating device of EA type for example.

The invention comprises numerous advantages, particularly the invention makes it possible to limit the risks of leaks thanks to the absence of additional fluid. Moreover, the invention makes it possible to obtain a size saving particularly thanks to the removal of the constituents of the enclosure comprising the additional liquid or gas.

Finally, the invention also makes it possible to reduce the system size thanks to the replacement of two valves by a single valve which functionally assures the roles of two valves used in the prior art. This gain is obtained while reducing as much as possible the commands of the computer, also known as FADEC according to certain products. In particular, a single command is required to activate the valve among all of its possible configurations.

This advantage confers an enhanced robustness and simplicity to the system in which the valve of the invention is incorporated.

The invention claimed is:

1. An actuating device, comprising:
a fixed portion forming a frame comprising an inlet intended to receive a fluid, a main outlet and a second outlet, and a return device;
a movable portion, wherein the return device is configured to exert a mechanical force on the movable portion, the movable portion comprising:
a shutter comprising a rod moving in translation between an open position of the second outlet and a closed position of said second outlet under the effect of the mechanical force;
a thermostatic device comprising a conical turning disc integral with a collar movable around the rod of the shutter, the turning of the disc above a known critical temperature driving the shutter to the closed position of same;
a control device allowing a holding force for holding the shutter to be generated, the control device being able to be controlled in such a way that below the critical temperature, the opening or the closing of the shutter results from the balance of forces between the holding force and the mechanical force.

2. The actuating device according to claim 1, wherein the mechanical force corresponds to a return force that is exerted by at least one return spring.

3. The actuating device according to claim 1, wherein the shutter comprises a core, a rod and an integral closing ball moving in translation to the closed position of same either under the effect of the mechanical force return device, or under the effect of the turning of the disc above the critical temperature.

4. The actuating device according to claim 3, wherein the conical turning disc mechanically drives the ball into a closed position of the shutter when the temperature exceeds the critical temperature.

5. The actuating device according to claim 4, wherein the ball comprises a ring integral with the ball, the collar driving said ring on a portion of its surface when the conical turning disc turns around.

6. The actuating device according to claim 1, wherein the control device is controlled by an electrical set point allowing a magnetic field to be generated by means of a coiling device, the core of the shutter comprising at least in part a ferromagnetic material, the induced magnetic force being able to be greater than the mechanical force so as to maintain the shutter in its open position.

7. The actuating device according to claim 6, wherein the conical turning disc makes it possible to act on an electrical circuit of the control device by an opening or closing of said circuit so as to generate either a magnetic or hydraulic force allowing the shutter to be closed when the temperature exceeds the critical temperature.

8. The actuating device according to claim 1, wherein the control device comprises a hydraulic regulating device controlled by a hydraulic control making it possible to introduce a fluid at a given pressure at the inlet of the actuating device, the pressure difference between the inlet of the frame and the main outlet generating a force retaining the shutter and which is greater than the mechanical force so as to maintain the shutter in its open position.

9. The actuating device according to claim 6, wherein the hydraulic regulating device is a servovalve.

10. The actuating device according to claim 9, wherein the frame comprises a third outlet enabling the hydraulic control to control the closing of the shutter when pressure is bled at the third outlet and controlling the opening of the shutter by the bleeding of an ambient pressure.

11. The actuating device according to claim 8, wherein the hydraulic regulating device is a solenoid type valve.

12. A valve comprising an actuating device according to claim 1.

* * * * *